Dec. 29, 1970    D. E. BAKER ET AL    3,551,789
STEP-TYPE STATIC TAP CHANGER APPARATUS WITH
HYSTERESIS AND STEERING MEANS
Filed June 11, 1968    4 Sheets-Sheet 1

WITNESSES:
Bernard R. Giaquey
James T. Young

INVENTORS
Donal E. Baker and
Robert E. Skamfer.
BY
Donald R. Lackey
ATTORNEY

United States Patent Office 3,551,789
Patented Dec. 29, 1970

3,551,789
STEP-TYPE STATIC TAP CHANGER APPARATUS WITH HYSTERESIS AND STEERING MEANS
Donal E. Baker, Lima, and Robert E. Skamfer, Elida, Ohio, assignors to Westinghouse Electric Corporation, Pittsburgh, Pa., a corporation of Pennsylvania
Filed June 11, 1968, Ser. No. 736,037
Int. Cl. H02p 13/06
U.S. Cl. 323—43.5                              27 Claims

ABSTRACT OF THE DISCLOSURE

Static tap changer apparatus for sequentially changing taps on a transformer in response to the magnitude of a unidirectional control voltage. The transformer, which is connected between a source of AC potential and a load circuit, includes at least one winding having a plurality of sequentially numbered tap connections. Each tap connection includes static bilateral AC switching means, gate drive means for providing switching signals for the AC switching means, and a threshold detector for activating the drive means. The threshold detectors are connected to the control voltage, with each being arranged to switch from a first output level to a second output level at predetermined different magnitudes of the control voltage, and to switch back to their first output levels at predetermined different magnitudes of the control voltage, which are lower than the predetermined voltage magnitudes at which they switched to their second output levels. The drive means associated with the highest numbered tap connection which has a threshold detector providing its second output level, provides drive signals for its associated AC switching means. As the control voltage increases or decreases, the tap changer changes taps to increase or decrease the output voltage of the transformer, in steps.

BACKGROUND OF THE INVENTION

(1) Field of the invention

The invention relates in general to tap changer apparatus, and more specifically to static tap changer apparatus for changing taps on a transformer in response to the magnitude of a unidirectional control signal.

(2) Description of the prior art

The most common method of varying the power applied to an AC load is to phase commutate static bilateral AC switches, such as silicon controlled rectifiers, or triacs, commonly called thyristors. This approach provides a continuously variable output voltage, but it also requires that the thyristors be switched every half cycle of the source voltage, usually at some point other than the zero current cross-over point. The rapid change of current ($di/dt$) from zero to the load limited value, generates a frequency spectrum of energy which feeds radio frequency energy into the power system. Thus, when this type of power controller or regulator system is connected to a power circuit which includes sensitive electronic apparatus, heavy, bulky, radio frequency filters must be connected to the input and output of the controller. Also, harmonic distortion filters may be necessary, as the resulting AC voltage waveform consists of only portions of a sine wave.

In those applications where weight and space are at a premium, adding heavy RFI filters and harmonic distortion filters to the apparatus is undesirable. For example, in aircraft electrical systems, the added weight and space required by the filters is especially undesirable. Therefore, it would be desirable to provide a new and improved power controller or regulator system in which the generation of radio frequency energy and harmonic distortion is minified, allowing the size and weight of the apparatus to be substantially reduced.

SUMMARY OF THE INVENTION

Briefly, the present invention is a new and improved static tap changer system which may be used in a power controller or regulator system, and which applies and removes AC power to the load in steps. Each step is a different magnitude sinusoidal voltage, which provides sinusoidal current. Thus, very little radio frequency energy is generated, and harmonic distortion in minimal, which reduces the size and weight of any filters required to a point where they no longer present a space or weight problem.

The new and improved static tap changer system includes a transformer having at least one winding, a plurality of tap connections on the winding, and static bilateral AC switching means connected to the taps. Terminals adapted for connection to a source of AC potential and a load circuit are connected to the transformer, with certain of the terminals being connected to the transformer through the AC switching means. Each of the AC switching means includes drive or gating means for providing switching signal to its associated AC switching means, and a threshold detector. The threshold detectors are all connected to suitable control means, which provides a unidirectional voltage having a magnitude responsive to a parameter which is to be regulated. The threshold detectors are each arranged to detector a different predetermined voltage magnitude, switching from a first output level to a second output level when its predetermined magnitude is reached, which causes its associated drive means to provide gating signals for its AC switching means. The threshold detectors have a predetermined hysteresis, which causes them to switch back to their first output levels at a lower control voltage than the predetermined voltage magnitude at which they switched to their second output levels. The threshold detectors are arranged to switch to their second output level in a sequence which, when increasing the output voltage, will cause the newly conductive AC switching means to commutate the previously conductive AC switching means. When reducing the output voltage, commutation will automatically occur at a zero current crossing point. Means are included to steer the switching of the taps, when increasing the output voltage of the tap changer system to a predetermined angle of the AC input voltage, in order to prevent the possibility of short circuiting the transformer winding.

BRIEF DESCRIPTION OF THE DRAWINGS

Further advantages and uses of the invention will become more apparent when considered in view of the following detailed description and drawings, in which.

DESCRIPTION OF PREFERRED EMBODIMENTS

Figure 1:
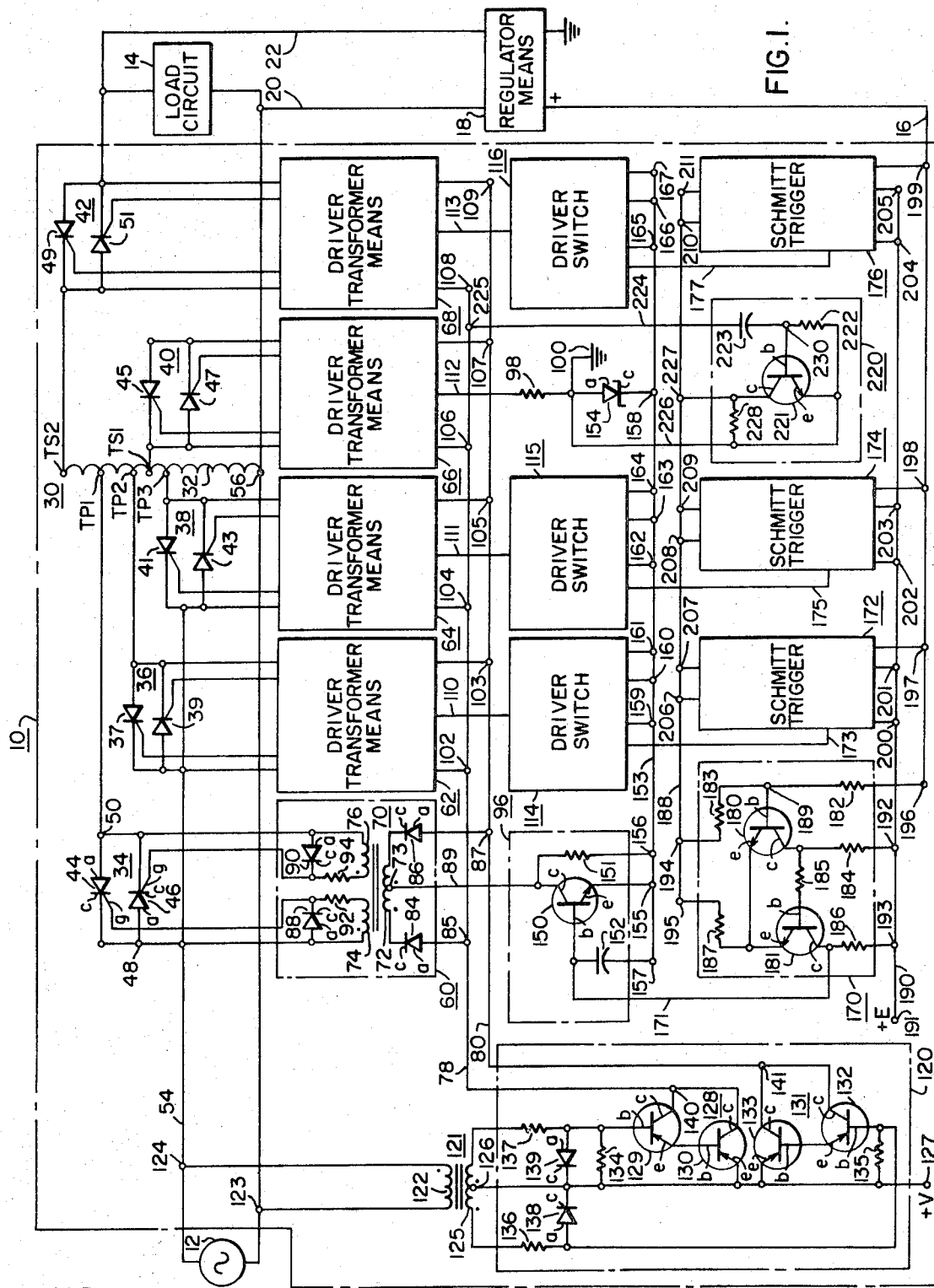
FIG. 1 is a schematic diagram of tap changer apparatus constructed according to an embodiment of the invention.

Referring to the drawings, and FIG. 1 in particular, there is shown a schematic diagram of tap changer apparatus 10 constructed according to the teachings of an embodiment of the invention, in which the load has a unity power factor. In general, tap changer apparatus 10 is a power or voltage stepping circuit, adapted for connection between a source 12 of AC potential and a unity power factor load circuit 14. Tap changer apparatus 10 will change the AC voltage magnitude applied to the load 14 in response to the magnitude of a DC bias or control voltage applied to the tap changer apparatus 10 via conductor 16. As illustrated in FIG. 1, this DC bias or control voltage may be provided by a regulator 18, connected to sense a parameter to be regulated. As shown in FIG. 1, this parameter may be the voltage across the load circuit 14, sensed by the regulator means 18 via conductors 20 and 22, with the unidirectional output voltage of the regulator 18 being connected to conductor 16, to provide the variable DC bias required to operate the tap changer apparatus 10. It is to be understood that the DC bias voltage may be responsive to any other suitable parameter, such as current, power, temperature or speed, depending upon the characteristics of the particular load; or, a source of DC voltage and a manual rheostat, may be used, if a manually operated tap changer system is desired.

More specifically, tap changer apparatus 10 includes a transformer 30, which may be an autotransformer as shown in FIG. 1, having a winding 32, or a transformer having isolated primary and secondary windings may be used, if desired. Transformer 30 may be switched in its primary circuit, secondary circuit, or both. Both primary and secondary circuit switching are illustrated in FIG. 1, as it may be desirable to use this arrangement in certain applications to reduce the blocking voltage ratings of the switching devices.

Transformer 30 includes a plurality of tap connections, with the number being determined by the number of voltage steps required by a specific application. For purposes of example, transformer 30 is illustrated as having three tap connections TP1, TP2 and TP3, in the primary circuit, and two tap connections TS1 and TS2 in the secondary circuit.

Each of the tap connections includes static bilateral AC switching means connected thereto, with the primary tap connections TP1, TP2 and TP3 having AC switching means 34, 36 and 38 connected thereto, respectively, and with the secondary tap connections TS1 and TS2 having AC switching means 40 and 42 connected thereto, respectively.

As illustrated in FIG. 1, each of the bilateral AC switching means, such as AC switching means 34, may include two silicon controlled rectifiers 44 and 46, each having gate, cathode and anode electrodes, g, c and a, respectively, connected in inverse parallel between terminals 48 and 50. In like manner, AC switching means 36 includes silicon controlled rectifiers 37 and 39, AC switching means 38 includes silicon controlled rectifiers 41 and 43, AC switching means 40 includes controlled rectifiers 45 and 47, and AC switching means 42 includes controlled rectifiers 49 and 51. The thyristor called the triac, which is a bidirectional triode, may also be used for each of the AC switching means, if desired.

One of the terminals of each of the bilateral AC switching means is connected to its associated tap connection. The remaining terminals of the AC switching means connected in the primary circuit of transformer 30 are connected to one side of AC source 12 via conductor 54, and the other side of the AC source 12 is connected to terminal 56 on winding 32. The remaining terminals of the AC switching means connected in the secondary circuit of transformer 30 are connected to one side of the load circuit 14, and the other side of the load circuit 14 is connected to terminal 56 on winding 32. Thus, by sequentially switching bilateral AC switching means 34, 36 and 38 to their conductive conditions, the output voltage from any selected tap position in the secondary circuit of winding 32 will be increased, because the volts-per-turn will be successively increased as the tap changes are made. As will hereinafter be explained, switching a higher numbered tap position to its conductive condition in the primary circuit, will automatically commutate the AC switching means connected to the next lower numbered tap position to its non-conductive state.

The output voltage for any given volts-per-turn may be increased by sequentially switching the AC switching means associated with the secondary circuit, in the direction of the numbered sequence of the secondary taps. Thus, switching from secondary tap TS1 to secondary tap TS2 will increase the output voltage, as it increases the number of turns in the secondary circuit, and since the volts-per-turn is fixed by the primary connection, increasing the number of turns in the secondary circuit will increase the output voltage. Switching to a higher numbered tap connection in the secondary circuit will automatically commutate the AC switching means connected to the next lower numbered secondary tap position to its non-conductive state.

Thus, winding 32 is sequentially tapped to reduce the number of turns in the primary circuit, and is sequentially tapped to increase the number of turns in the secondary circuit, when higher output voltages are required. If lower output voltages are required, the sequence will be reversed, with the taps being switched in the direction of adding more turns to the primary circuit, and to reduce the number of turns in the secondary circuit. When reducing the output voltage, the conductive AC switching means will continue to conduct until it reaches a current zero crossing point, at which time a previously signalled tap change to reduce the output voltage will automatically be made.

Each of the AC switching means includes driver transformer means for providing drive or gating signals, when energized, to the controlled rectifiers of its associated AC switching means, during the time each controlled rectifier has forward voltage applied thereto. For example, AC switching means 34, 36, 38, 40 and 42 have driver transformer means 60, 62, 64, 66 and 68, respectively. Since each of the driver transformer means are similar, only driver transformer means 60, connected to AC switching means 34, is shown in detail.

Specifically, driver transformer means 60 includes a transformer 70 having a primary winding 72, center tapped at 73, and secondary windings 74 and 76, diodes or rectifiers 84, 86, 88, 90, each having an anode and cathode electrode, $a$ and $c$, respectively, and resistors 92 and 94. Primarily winding 72 has its ends connected to conductors 78 and 80 via diodes 84 and 86, respectively, with the cathode electrodes $c$ of the diodes being connected to the ends of primary winding 72, and their anode electrodes $a$ being connected to conductors 78 and 80 at terminals 85 and 87, respectively. Secondary winding 74 provides gate drive for controlled rectifier 44, with one end of winding 74 being connected to terminal 48, and the other end being connected to the gate electrode $g$ of controlled rectifier 44 via current limiting resistor 92. Secondary winding 76 provides gate drive for controlled rectifier 46, with one end of winding 76 being connected to the gate electrode $g$ of controlled rectifier 46 via current limiting resistor 94, and its other end being connected to terminal 50. Drive current limiting in the secondary windings of transformer 70 is preferred, in order to obtain complete half wave drive for the controlled rectifiers. Current limiting in the primary may cause the transformer to saturate, due to differences in the controlled rectifiers. Diodes 88 and 90 are connected across the gate-cathode electrodes of controlled rectifiers 44 and 46, respectively, and poled to prevent excessive reverse voltages from being applied thereto.

The center tap 73 of primary winding 72 is connected via conductor 89 to a static drive switch 96, which will be hereinafter explained in detail. Driver transformer means 60 will be inoperative until the center tap 73 is connected to ground via its driver switch 96. The remaining driver transformer means have their primary windings connected to conductors 78 and 80, and the center tap of their primary windings are each connected to a driver switch, with the exception of driver transformer means 66. Driver transformer means 66 may have its center tap connected directly to ground 100 via conductor 112 and a current limiting resistor 98. This saving of one driver switch is possible since a tap connection in the secondary circuit may be continuously supplied with gate drive, as there will be no output voltage until a primary tap connection is connected to the source 12 of AC potential.

Driver transformer means 62 is connected to conductors 78 and 80 at terminals 102 and 103, respectively, and to a driver switch 114 via conductor 110; driver transformer means 64 is connected to conductors 78 and 80 at terminals 104 and 105, respectively, and to a driver switch 115 via conductor 111; driver transformer means 66 is connected to conductors 78 and 80 at terminals 106 and 107 and to ground 100 via conductor 112 and resistor 98; and, driver transformer means 68 is connected to conductors 78 and 80 at terminals 108 and 109, and to driver switch 116 via conductor 113.

The voltage for operating the plurality of driver transformer means, synchronized with the AC source 12, is applied to conductors 78 and 80. Properly synchronized voltage signals may be obtained by a square wave oscillator 120. Square wave oscillator 120 may include a transformer 121 having a primary winding 122 connected to the source 12 of AC potential at terminals 123 and 124, and a secondary winding 125 having a center tap 126. Center tap 126 is connected to a terminal 127 which is adapted for connection to the positive terminal of a source V of DC potential. The square wave output voltage of the square wave oscillator 120 appears at output terminals 140 and 141, and is generated by driving two Darlington connected transistor circuits 128 and 131 in flip-flop. Darlington circuit 128 includes PNP type junction transistors 129 and 130, each having base, collector and emitter electrodes b, c and e, respectively. The collector electrodes c of transistors 129 and 130 are connected to output terminal 140, the base electrode b of transistor 130 is connected to the emitter electrode e of transistor 129, the base electrode b of transistor 129 is connected to one end of secondary winding 125 via resistor 137, and the emitter electrode e of transistor 130 is connected to terminal 127. A biasing resistor 134 and a blocking diode 139 are each connected across the base-emitter circuit of the Darlington circuit 128, with the anode electrode a of diode 139 being connected to the base electrode b of transistor 129, and its cathode electrode c is connected to the emitter electrode e of transistor 130. In like manner, Darlington circuit 131 includes PNP junction transistors 132 and 133, each having base, collector and emitter electrodes b, c and e, respectively. The collector electrodes c of transistors 132 and 133 are connected to output terminal 141, the base electrode b of transistor 133 is connected to the emitter electrode e of transistor 132, the base electrode b of transistor 132 is connected to the other end of secondary winding 125 via resistor 136, and the emitter electrode e of transistor 133 is connected to terminal 127. A biasing resistor 135 and a blocking diode 138 are each connected across the base-emitter circuit of the Darlington circuit 131, with the anode electrode a of diode 138 being connected to the base electrode b of transistor 132, and its cathode electrode c is connected to the emitter electrode e of transistor 133.

When the end of secondary winding 125 connected to the base electrode b of transistor 129 is negative with respect to terminal 127, transistors 129 and 130 will be conductive, connecting the DC voltage V applied to terminal 127 to output terminal 140 and conductor 78. Darlington circuit 131 will be non-conductive. Thus, diode 84 of driver transformer means 60 will be forward biased and current will flow through diode 84, if driver switch 96 is conductive, to provide gate drive to controlled rectifier 46. When the source 12 changes polarity, the end of secondary winding 125 connected to the base electrode b of transistor 132 will be negative, and Darlington circuit 131 will be conductive, applying the voltage V to conductor 80, and Darlington circuit 128 will be non-conductive. Thus, diode 86 will be forward biased and current will flow therethrough if driver switch 96 is conductive, to provide gate drive to controlled rectifier 44. Gate drive will be provided to the similarly connected controlled rectifiers of the other AC switching means, if their associated driver switches are conductive. Since driver transformer means 66 is not connected to a driver switch, gating signals will be applied to AC switching means 40, as soon as square wave oscillator 120 is operative. However, current will not flow to the load circuit 14 until one of the AC switching means in the primary circuit is provided with gate drive.

Since the driver switches 96, 114, 115 and 116 for activating their associated driver transformer means 60, 62, 64 and 68, respectively, may all be of a similar construction, only driver switch 96 for activating driver transformer means 60 is shown in detail. Driver switch 96 includes an NPN transistor 150 having base, collector and emitter electrodes b, c and e, respectively, with its collector electrode c being connected to conductor 89, and thus to the center tap 73 of transformer 70 in driver transformer means 60. The emitter electrode e of transistor 150 is connected to a conductor 153, which is connected to ground 100 via a Zener diode 154. Zener diode 154 has its cathode electrode c connected to conductor 153 at terminal 158, and its anode electrode a is connected to ground 100. Zener diode 154 is selected to provide a slight positive potential on conductor 153, which is a back bias to prevent transistor 150, and the transistors in the other drivers, from being falsely switched due to transient spikes in the system. The base electrode b of transistor 150 is connected to conductor 153, and thus to the emitter electrode e of transistor 150 via a capacitor 152. The function of capacitor 152 will be hereinafter described. The remaining driver switches are connected in like manner to their associated driver transformer means and conductor 153, with driver switch 114 being connected to its associated driver transformer means 62 via conductor 110, and to conductor 153 at terminals 159, 160 and 161; driver switch 115 is connected to its associated driver transformer means 64 via conductor 111, and to conductor 153 at terminals 162, 163 and 164; and, driver switch 116 is connected to its associated driver transformer means 68 via conductor 113, and to conductor 153 at terminals 165, 166 and 167.

The driver switches 96, 114, 115 and 116 each have a trigger circuit connected to trigger the conduction of their associated transistors. For example, driver switch 96 has a trigger circuit 170 connected to the base electrode b of transistor 150 via conductor 171, driver switch 114 is connected to a trigger circuit 172 via conductor 173, driver switch 115 is connected to a trigger circuit 174 via conductor 175, and driver switch 116 is connected to a trigger circuit 176 via conductor 177. Since each of the trigger circuits may be of similar construction only trigger circuit 170 is shown in detail in FIG. 1.

Each of the trigger circuits is connected to the variable DC control bias applied to conductor 16 from regulator means 18. The trigger circuits must be threshold detectors, each having a predetermined different threshold, at which point they switch from a first output level to a second output level. Once the triggers switch to their second output levels, the voltage to which the control voltage must drop in order to cause them to switch back to their first output levels, must be lower than their predetermined threshold levels, in order to prevent the tap changer from jumping back and forth between taps when the control voltage is near the threshold of one of the triggers. The trigger circuits must have the characteristic of switching between their output levels with a snap action, regardless of how slowly the control voltage approaches their threshold levels.

A bistable multivibrator connected in the Schmitt trigger configuration has been found to provide all of the required characteristics of the threshold detectors. The predetermined threshold voltage at which the Schmitt trigger will change output states is determined by the values of resistors in a voltage divider. The Schmitt trigger is regenerative. Thus, once its threshold voltage is reached, it will switch with a "snap" action, regardless of how slow its threshold voltage was approached. Further, by setting the loop gain of the Schmitt trigger greater than unity, the Schmitt trigger has hysteresis. In other words, when the Schmitt trigger switches from its first to its second output levels at its threshold voltage, the control voltage must drop below the threshold magnitude by a predetermined amount before the Schmitt trigger will switch back to its first output level.

Specifically, threshold detector or Schmitt trigger 170 is a bistable multivibrator having first and second NPN transistors 180 and 181, each having base, collector and emitter electrodes $b$, $c$ and $e$, respectively, and resistors 182, 183, 184, 185, 186 and 187.

Resistors 182 and 183 are serially connected between terminal 196 on conductor 16, which provides the control or bias voltage, to terminal 194 on conductor 188, with the junction 189 of these resistors being connected to the base electrode $b$ of the first transistor 180. The value of resistors 182 and 183 are selected to provide the desired threshold voltage at which threshold detector 170 is to switch to its second output level, in response to the voltage from regulator means 18. The collector electrode $c$ of transistor 180 is connected to terminal 192 on conductor 190 via resistor 184, and conductor 190 is connected to a terminal 191 which is adapted for connection to the positive terminal of a regulated source E of DC voltage. The emitter electrode $e$ of transistor 180 is connected to the emitter electrode $e$ of transistor 181.

The base electrode $b$ of transistor 181 is connected to the collector electrode $c$ of transistor 180 via resistor 185, its collector electrode $c$ is connected to terminal 193 on conductor 190 via resistor 186, and to driver switch 96 via conductor 171, and its emitter electrode $e$ is connected to terminal 195 on conductor 188 via resistor 187.

In like manner, Schmitt trigger 172 is connected to terminal 197 on conductor 16, to terminals 200 and 201 on conductor 190, and to terminals 206 and 207 on conductor 188. Schmitt trigger 174 is connected to terminal 198 on conductor 16, to terminals 202 and 203 on conductor 190, and to terminals 208 and 209 on conductor 188. Schmitt trigger 176 is connected to terminal 199 on conductor 16, to terminals 204 and 205 on conductor 190, and to terminals 210 and 211 on conductor 188.

In the operation of Schmitt trigger 170, when the control voltage on conductor 16 is below the threshold or trigger voltage of the Schmitt trigger, transistor 180 will be non-conductive and transistor 181 will be conductive. The voltage at the collector electrode $c$ of transistor 181 will be less than the back bias voltage applied to the emitter electrode $e$ of transistor 150, and transistor 150 in the driver switch 96 will be non-conductive. When the control voltage on conductor 16 reaches the threshold voltage of Schmitt trigger 170, transistor 180 will switch to its conductive state and transistor 181 will switch to its non-conductive state. When the transistors 180 and 181 start to switch, the voltage at the emitter elecrodes $e$ of transistors 180 and 181 starts to drop, which forces transistor 180 to switch to saturation more rapidly, and to force transistor 181 to switch to cut-off more rapidly. When transistor 181 becomes non-conductive, its collector voltage will be increased to substantially the magnitude of the value of the Zener diode voltage, and will overcome the back bias on the emitter electrode $e$ of transistor 150, switching transistor 150 to its conductive state and connecting the center tap 73 of driver transformer 70 to ground 100. Thus, transformer 70 will start to provide phased gating signals to controlled rectifiers 44 and 46 of bilateral AC switching means 34.

When transistor 180 is conductive and transistor 181 is nonconductive, the voltage at the emitter electrode $e$ of transistor 180 is less than when transistor 181 is conductive, since the voltage drop is only due to resistor 184. Thus, in order to switch the threshold detector back to its first output level, the control voltage on conductor 16 must drop to a magnitude less than the threshold voltage at which the threshold detector 170 switched to its second output level. This characteristic is called hysteresis, and is essential for the proper operation of the tap changer apparatus 10, as it prevents rapid pumping back and forth between adjacent taps when the control voltage waivers slightly near the threshold voltage of one of the Schmitt triggers.

The Schmitt trigger should not be allowed to switch at random during a cycle of the source voltage. Switching to a new tap to increase the output voltage of the tap changer apparatus 10 at a current zero crossing point, which is the same as the voltage zero crossing point since the load has unity power factor, may cause the AC switching means of two tap connections to be rendered conductive, which would short circuit the portion of winding 32 between these two taps. To explain this more fully, assume that tap changer apparatus 10 is operating on primary tap TP1 in the negative half cycle of the source voltage, which means controlled rectifier 44 will be conductive, and the control signal increases to a point where AC switching means 36 is supplied with drive signals at the positive going zero crossing point of the AC source voltage. Controlled rectifier 39 of AC switching means 36 will be switched to its conductive state. This will cause the voltage at tap connection TP1 to be more positive than the voltage at terminal 48, thus causing a polarity change or phase reversal across controlled rectifier 44. Since controlled rectifier 44 just completed conducting at the current zero point of the load current, the polarity reversal across controlled rectifier 44 by this transformer action of the transformer 30, immediately applies forward voltage to controlled rectifier 44. If the time between the cessation of forward current flow in controlled rectifier 44 and the application of forward voltage thereto by the polarity reversal is not longer than the turn-off time of controlled rectifier 44, which is usually 10 to 15 microseconds, controlled rectifier 44 will continue to conduct. Since controlled rectifier 39 is also conducting, the winding between taps TP1 and TP2 will be short circuited.

It will be observed that this polarity reversal associated with an AC switching means, as the next higher voltage tap connection is activated, may be used to advantage by eliminating the need of disabling the drive signals to the AC switching means associated with the lower voltage taps, since the drive signals will be applied to a controlled rectifier associated with these lower voltage taps, only when reverse voltage is applied thereto. However, this advantage may only be used if sufficient time is allowed for a controlled rectifier to turn-off, before forward voltage is applied thereto.

The tap changer apparatus 10 precludes improper operation of the tap changer by steering the turn-on of the Schmitt triggers to a predetermined point during the voltage cycle of the source voltage. The point selected, in this embodiment of the invention, is the positive going zero crossing of the source voltage. The Schmitt triggers thus change from their first to their second output states only at the positive going zero crossings of the source voltage, and the output signal from the Schmitt triggers to the driver switches is then delayed a predetermined number of electrical degrees, to start providing drive signals for the AC switching means a predetermined number of degrees following a voltage zero crossing.

More specifically, the steering of the triggering of the

Schmitt triggers is provided by a pulse circuit 220 which provides a negative pulse on conductor 188, which conductor is connected to the emitter electrodes e of the transistors in the threshold detectors, with the pulse being applied each time the source voltage goes through zero in a positive direction. The magnitude of the negative pulse is selected to be less than the amount of hysteresis in the Schmitt trigger circuits. For example, if the hysteresis is .4 volt, the negative pulse may be selected to have a magnitude of .2 volt. Further, the control or bias voltage applied to conductor 16 must have a rate of change which is small compared to the frequency of the AC source. This may be accomplished by including a ramp generator in the regulator means 18, which converts any change in the regulator output to a ramp having a predetermined slope. For example, the output of the regulator system 18 may be connected across a capacitor of suitable value.

The pulse circuit 220 includes an NPN transistor 221 having base, collector and emitter electrodes b, c and e, respectively, resistors 222 and 228, and a capacitor 223. The capacitor 223 and resistor 222 are connected serially from terminal 225 on conductor 78 to ground 100. Capacitor 223 has one end connected to terminal 225, which has a square wave voltage applied thereto which is in phase with the source voltage, and the other end of capacitor 223 is connected to the resistor 222 at junction 230. Resistor 222 is connected to ground via conductor 226. Transistor 21 has its base electrode b connected to junction 230, its collector electrode c is connected to conductor 188 at terminal 227, and its emitter electrode e is connected to ground 100 via conductor 226. Resistor 228 is connected across the collector and emitter electrodes of transistor 221.

When the square wave voltage between conductor 78 and ground 100 increases from its minimum to its maximum value, current will flow into the base electrode b of transistor 221, which switches transistor 221 to its conductive state and shorts out the slight positive voltage on conductor 188, causing a momentary dip in the emitter voltages of the transistors in the Schmitt trigger circuits. Thus, if the control voltage is near a threshold of one of the Schmitt triggers, increasing along a predetermined ramp, the momentary drop in the emitter voltage will reduce the threshold voltage of the trigger sufficiently to trigger the selected Schmitt trigger. Once the Schmitt trigger switches to its second output state, the hysteresis of the Schmitt trigger drops the voltage at which it will trigger back, by an amount greater than the voltage drop provided by the pulse circuit 220. Thus, when a tap change is to be made, it is initiated by switching a Schmitt trigger at a zero crossing point in the source voltage cycle.

When a Schmitt trigger is switched from its first to its second output states, such as Schmitt trigger 170, the voltage increases at the base electrode b of the drive switch transistor, such as transistor 150 of drive switch 96. The voltage across capacitor 152 cannot change instantaneously, however, but requires a certain finite time to charge. Thus, the switching of transistor 150 will be delayed by the charging time of capacitor 152. The function of capacitor 152, therefore, is that of time delay, to delay the tap change by a predetermined angle following a voltage zero crossing point of the source voltage. Therefore, a tap change cannot occur at a zero crossing point, which precludes rendering two tap connections conductive at the same time, and prevents winding 32 from being short circuited.

The only discontinuity in the sine wave voltage applied to the load circuit will be when the tap changer apparatus 10 changes taps to increase the output voltage. This discontinuity is due to the change of taps at a predetermined number of degrees from a voltage zero crossing point, which steps-up the output voltage according to the number of turns between the taps. This step in the output voltage, however, generates a negligible amount of radio frequency energy. Once a tap change is made, all gating is accomplished at voltage zero cross-over points, providing sine waves with little radio frequency energy, and free from harmonic distortion. When changing taps to reduce the output voltage, the turn-off of a Schmitt trigger is not steered, but is allowed to occur at random. However, the cessation of drive signals to a conductive controlled rectifier has no affect on its conductivity. It will continue to conduct to the first current zero point of the load current, at which point it will become nonconductive, and the newly selected tap connection will be automatically made. Therefore, when reducing the output voltage, the output voltage will be sine waves with little radio frequency energy.

Figure 2:
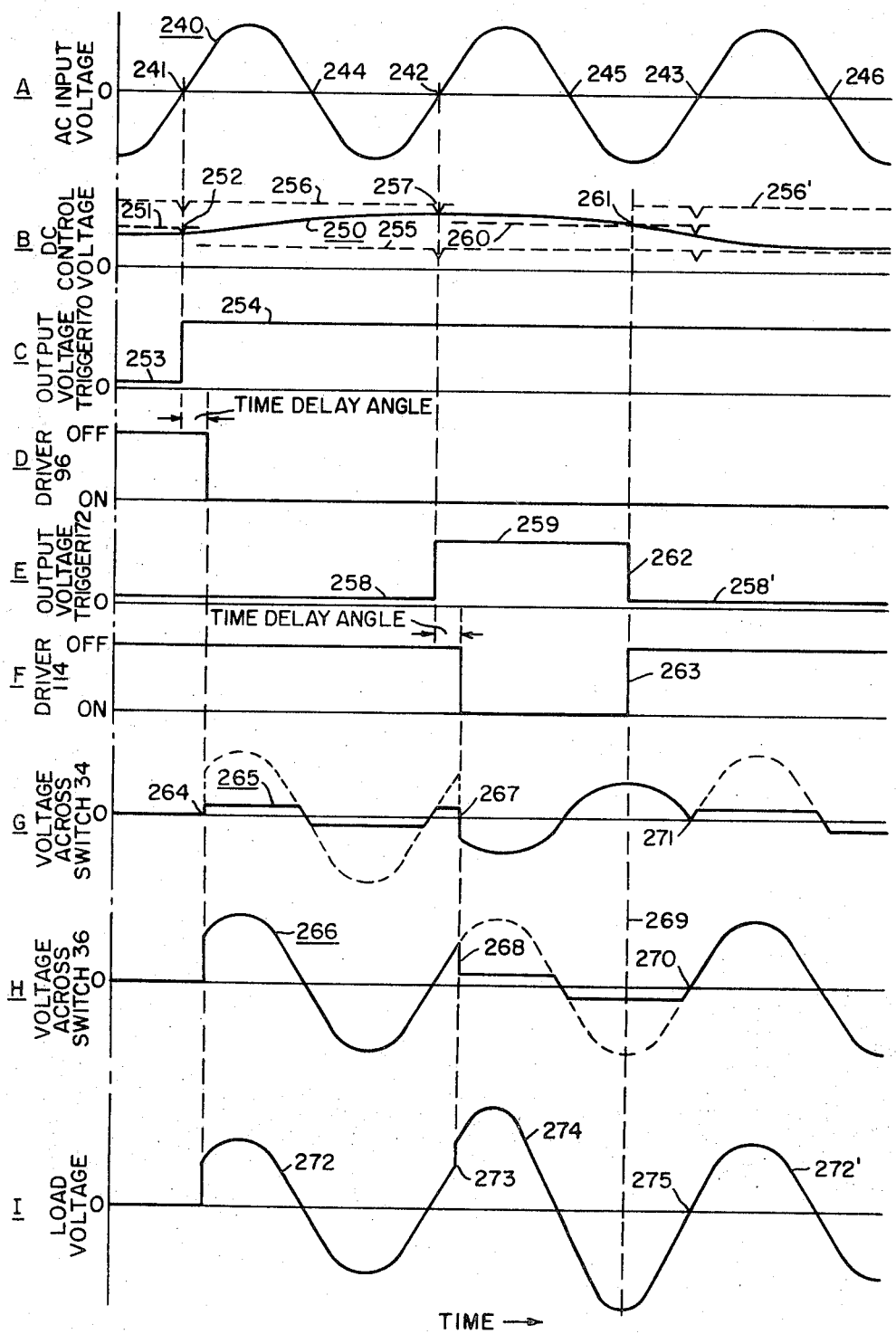
FIG. 2 is a group of curves which are explanatory of the operation of the embodiment of the invention shown in FIG. 1.

The operation of the tap changer apparatus 10 shown in FIG. 1 will now be described, using the curves A through I shown in FIG. 2. Curve A of FIG. 2 illustrates the AC input voltage waveform 240, which has positive going zero crossing points 241, 242 and 243, and negative going zero crossing points 244, 245 and 246. Curve B of FIG. 2 illustrates the DC control or bias voltage waveform 250. Dotted line 251 represents the threshold voltage of Schmitt trigger circuit 170, with the negative going dip 252 being caused by the pulse circuit 220 at the zero point 241 of the AC voltage waveform 240. The rising control voltage 250 intersects the dip 252, which causes Schmitt trigger 170 to switch from its first output level 253 to a second output level 254, as shown in curve C of FIG. 2. This switching of output levels occurs at the zero point 241 of the AC waveform 240. As shown in curve B of FIG. 2, the voltage at which Schmitt trigger 170 will switch back to its first output level now drops to a magnitude indicated by dotted line 255. Curve D of FIG. 2 represents the conductive state of drive switch 96, which is "off" or nonconductive until a predetermined angle following the change in output levels of the Schmitt trigger 170.

As the control voltage continues to increase, it approaches the threshold level of AC switching means 36 represented by dotted line 256 in curve B of FIG. 2, and the negative going pulse 257 in the threshold voltage intersects the control voltage waveform 250, causing Schmitt trigger 172 to switch from its first output level 258 to its second output level 259, at a point which coincides with the voltage zero crossing point 242 of the AC waveform 240. The conductive state of drive switch 114 is shown in curve F of FIG. 2, becoming conductive a predetermined angle after the Schmitt trigger 172 switches to its second output level. After Schmitt trigger 172 switches to its second output level, the voltage at which it will switch back to its first output level drops to the magnitude indicated by dotted line 260. If the control voltage 250 now drops and crosses dotted line 260 at point 261, Schmitt trigger 172 will switch to its first output level 258' at 262, and driver switch 114 will become nonconductive at point 263.

The effect of the above described tap changes will now be examined with respect to the voltage across AC switching means 34, the voltage across AC switching means 36, and the voltage across the load circuit 14, in curves G, H and I of FIG. 2, respectively. In curve G of FIG. 2, the voltage 265 across AC switching means 34 is equal to the forward voltage drop across a controlled rectifier, starting at point 264, which is the point at which tap changer apparatus 10 was first energized, while the voltage 266 across the nonconductive switching means 36 is the voltage difference between tap connections TP1 and TP2, and this voltage is in phase with the source voltage 240 shown in FIG. 1. When the tap change is made, the voltage across AC switching means 34 will increase, starting at point 267, and it will be 180° out of phase with the AC source voltage 240. Thus, while the AC source voltage is in its positive half cycle, the voltage across AC switching means 34 will be in its negative half cycle. This is due to the fact that the voltage at tap TP1 will now be greater than the voltage at terminal 48, as was hereinbefore explained. When the tap change is made, the voltage across AC switching means 36 will drop to the forward voltage drop across a conductive controlled rectifier, at point 268.

As shown by the dotted line 269, the next signal for a tap change comes in the middle of an AC voltage waveform half cycle. Since this tap change is to lower the output voltage, it is not necessary to steer it to a particular point. As shown in curves G and H of FIG. 2, the conductive AC switching means 36 continues to conduct to the first current zero point 270, at which point it becomes nonconductive since it has lost its gating signals. AC switch 34 has remained nonconductive to point 271, even though it has been continuously receiving gate drive signals, as evidenced by curve D of FIG. 2, because the forward drive has been out of phase with the drive signals. Once AC switching means 36 becomes nonconductive, the voltage across AC switching means 34 will again be in phase with its drive signals, and AC switching means 34 will become conductive at point 271.

These tap changes are illustrated in the output or load voltage shown in curve I of FIG. 2. The output voltage follows sine wave 272 to point 273, at which point it steps up to follow a sine wave 274 of greater magnitude. At zero point 275 the load voltage follows the lower magnitude sine wave 272′. Therefore, the only discontinuity in the output voltage waveform occurs when increasing the output voltage, at each tap change. The radio frequency energy produced by this step in the output voltage, however, is insignificant, requiring only nominal RF filtering to be included with tap changer apparatus for the most sensitive of applications, and for most applications no filtering will be required.

When switching both the primary and secondary circuits of the transformer 30, which has the advantage of being able to reduce the peak reverse blocking ratings of the AC switching devices, the Schmitt triggers may be set to switch from tap connection TP1 to tap connnection TP2, from tap connection TP2 to tap connection TP3, and then from tap connection TS1 to tap connection TS2, while increasing the output voltage, and the reverse sequence will be used when reducing the output voltage. Or, by adding suitable logic circuitry, which includes interlocks and additional trigger circuits, it would be possible to stay on a primary tap while switching through all of the secondary taps, and then switch to the next primary tap and again switch through all of the secondary taps. Thus, with five taps on the primary and five taps on the secondary, it would be possible to have 25 different output voltage levels. As illustrated in FIG. 1, all of the primary switching should be in the sequence to reduce the number of turns, and all of the secondary switching should be in a sequence to increase the number of turns, when increasing the output voltage of the apparatus, and the opposite sequence should be followed when reducing the output voltage of the apparatus.

In the embodiment of the invention shown in FIG. 1, the load circuit was assumed to be a unity power factor load, all of the AC switching means connected to taps having a lower numerical number than the operating tap continue to receive drive signals, and the turn-off points of the Schmitt triggers are uncontrolled. Since most load circuits will not be purely resistive, it would be desirable to be able to modify tap changer apparatus 10 to operate with lagging or leading power factor loads. It would also be desirable to be able to disable the drive of the AC switching means associated with lower numbered taps than the operating tap, to increase the efficiency of the system, and it would also be desirable to be able to control the turn-off points of the Schmitt triggers to a predetermined angle, in order to minimize turn-off transients.

Figure 3:
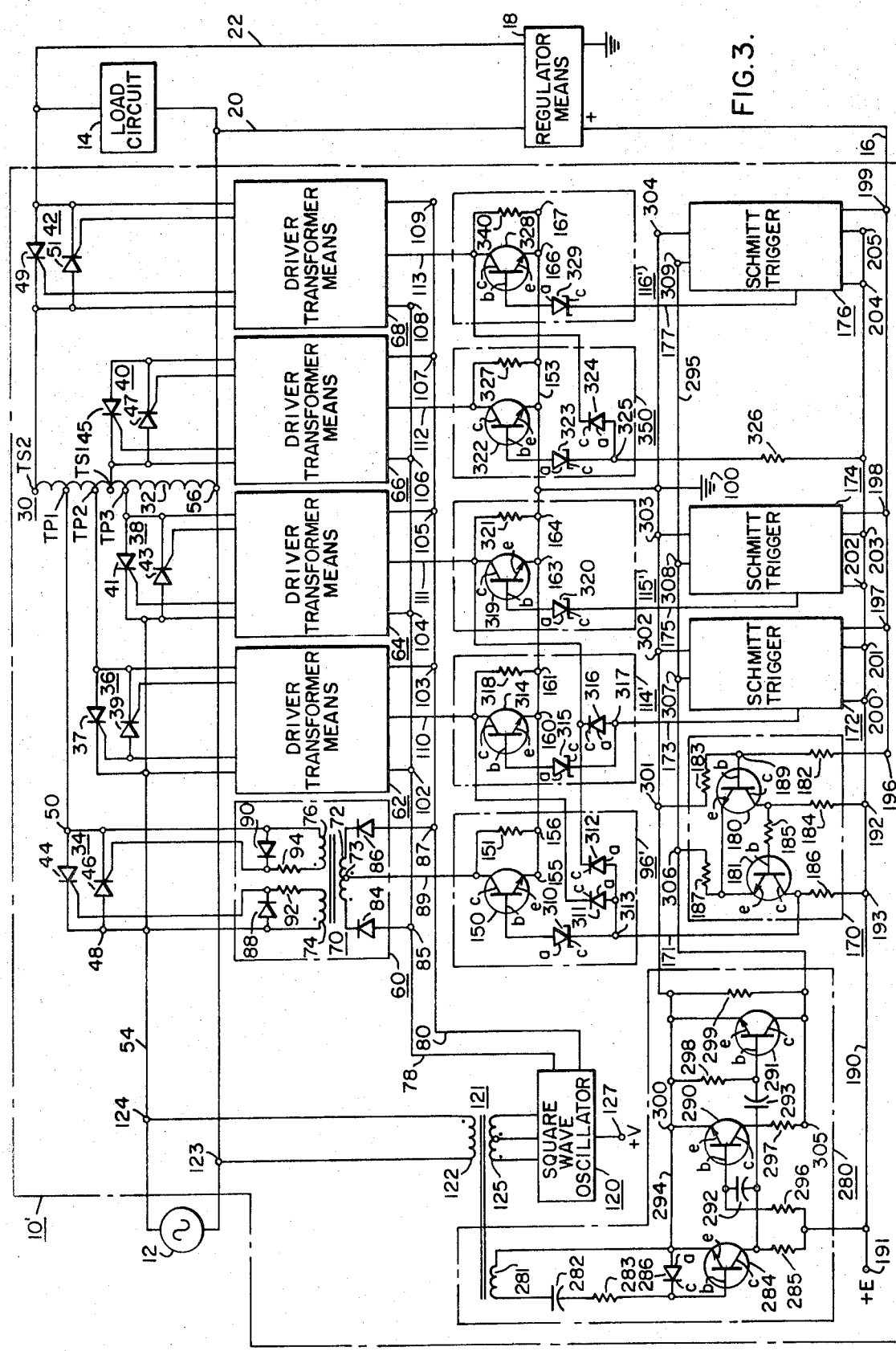
FIG. 3 is a schematic diagram of tap changer apparatus constructed according to another embodiment of the invention.

FIG. 3 is a schematic diagram of tap changer apparatus 10′ constructed according to an embodiment of the invention which incorporates the above-mentioned changes. Like reference numerals in FIGS. 1 and 3 indicate like components, and they will not be described again in detail.

The tap changer apparatus 10 shown in FIG. 1 may be changed to operate with either a leading or a lagging power factor load. For purposes of example, it will be assumed that load 14 has a lagging power factor. Basically, the change requires developing a current which is a predetermined angle out of phase with the AC source voltage, and then provide a unidirectional square wave voltage in phase with this current. The unidirectional square wave voltage is fed into a circuit which provides negative going pulses when the square wave voltage changes from its minimum to its maximum values, and positive going pulses when the square wave voltage changes from its maximum to its minimum values. The negative going pulses are used to steer the switching of the Schmitt triggers from their first to their second output levels, and the positive going pulses are used to steer the switching of the Schmitt triggers from their second to their first output levels. Thus, the turn-on and turn-off pulses provided by the steering circuit are 180° apart. Selecting the turn-on angle automatically selects the turn-off angle. The turn-on angle should be late enough in the AC source voltage cycle to insure that the lagging current has crossed zero, and the turn-off should be such that a minimum flux is in the iron of the driver transformer, to minimize transient conditions when the flux resets, which may falsely trigger a controlled rectifier. An angle of 60° before the negative going zero crossing of the AC voltage source is excellent for turning off the Schmitt triggers, as it is near the point at which the reset pulse of the driver transformers will be zero, and the resulting turn-on angle will thus be 60° before the positive going zero crossing of the AC source voltage. This is also suitable, as it allows the load current to lag the line voltage from zero to 90° without changing taps at a zero current crossover point, and still allow sufficient clearing time for a thyristor to recover its blocking ability before forward voltage is applied thereto. Therefore, these angles will be used in describing the embodiment of the invention shown in FIG. 3, but it is to be understood that the other suitable angles may be utilized.

A steering or pulse circuit 280 for providing these func tions is shown in FIG. 3. The 60° leading current with respect to the AC source voltage is developed by adding an additional winding 281 to transformer 121; or, another transformer may be used, which would be connected to the source 12 of AC potential. A capacitor 282 and resistor 283 are serially connected to one side of winding 281. Winding 281, along with the serially connected capacitor and resistor, is connected to an NPN transistor 284, which has base, collector and emitter electrodes b, c and e, respectively. Resistor 283 is connected to base electrode b of transistor 284, and the other end of winding 281 is connected to its emitter electrode e. The collector electrode c of transistor 284 is connected to the source of regulated DC voltage E via resistor 285, and a blocking diode 286 may be connected across the base-emitter electrodes of transistor 284, which is poled to allow only positive half cycles of the AC voltage developed in winding 281 to be applied to transistor 284. Transistor 284 is switched at the 60° points before the source voltage zero cross-over points, providing a 60° leading unidirectional square wave voltage at its collector electrode. This square wave voltage is capacitively coupled to NPN transistors 290 and 291 via capacitors 292 and 293, respectively. Transistors 290 and 291 each have base, collector and emitter electrodes b, c and e, respectively. The base electrode b of transistor 290 is connected to the collector electrode c of transistor 284 via coupling capacitor 292, and to the source E of regulated DC voltage via resistor 296; its emitter electrode e is connected to a conductor 294 at terminal 300, which conductor is connected to one end of the voltage divider in the Schmitt trigger circuits 170, 172, 174 and 176 at terminals 301, 302, 303 and 304, respectively; and, its collector electrode c is connected, via resistor 297, to a conductor 295 at terminal 305, which conductor is connected to the emitter electrodes of the transistors in the Schmitt triggers 170, 172, 174 and 176, at terminals 306, 307, 308 and 309, respectively.

Transistor 291 has its base electrode b connected to the collector electrode c of transistor 284 via coupling capacitor 293, and to conductor 294 via resistor 298; its collector electrode c is connected to conductor 295; and, its emitter electrode e is connected to conductor 294. A resistor 299 is connected across conductors 294 and 295.

In the operation of the pulse circuit 280, transistor 290 is normally conductive, due to base drive being provided through resistor 296. The time constant of capacitor 292 is selected to be small compared to one cycle of the AC source voltage, so that transistor 290 is pulsed off once each cycle, by the side of the square wave voltage which is changing from its maximum to its minimum value. This momentarily increases the voltage appearing across resistor 299, which appears at the emitter electrodes of the transistors in the Schmitt trigger circuits as a small positive pulse.

Transistor 291, on the other hand, is normally biased off, but capacitor 293 pulses transistor 291 to its conductive state each time the square wave voltage at the collector electrode c of transistor 284 changes from its minimum to its maximum magnitudes, which momentarily reduces the voltage across resistor 299 and appears at the emitter electrodes of the transistors in the Schmitt trigger circuits as a small negative pulse. The amplitudes of these positive and negative pulses is determined by the values of resistors 297 and 299, and is selected to be less than the hysteresis of the Schmitt trigger circuits. These negative and positive pulses steer the turn-on and turn-off of the Schmitt triggers, respectively, to the 60° points prior to a current zero crossing of the AC source voltage waveform, with the positive pulses occurring 60° before the negative going zero crossing of the source voltage, causing the Schmitt triggers to be turned off at this specific angle, and with the negative pulses occurring 60° before the positive going zero crossing of the source voltage, and causing the Schmitt triggers to be turned on at this specific angle. Since the turn-on of the Schmitt triggers is not a a zero current crossing, a time delay between the triggering of the Schmitt trigger circuits and the switching of their associated driver switches is not required. Drive signals may be provided by the driver transformer as soon as its associated Schmitt trigger switches to its second output level.

The next change in the tap changer apparatus 10' shown in FIG. 3, compared with the tap changer apparatus 10 shown in FIG. 1, is a lock-out feature which automatically disables the gate drive applied to the AC switching means associated with a lower numbered tap position, when the AC switching means of a higher numbered tap position becomes conductive. This lock-out function is accomplished by connecting each of the driver switches to its associated Schmitt trigger circuit through a Zener diode, and by connecting a diode from the junction between each Zener diode and Schmitt trigger to each of the collector electrodes of the transistors in all of the driver switches associated with a higher numbered tap connection in the same primary, or the same secondary circuit. In this embodiment of the invention, driver transformer means 66 requires a driver switch 350, since the drive will not be continuously supplied to AC switching means 40 once a higher numbered secondary tap connection is energized. However, AC switching means 40 will still not require a Schmitt trigger, as it may be connected directly to the source voltage E of the regulated DC voltage via a resistor 326, and will thus cause drive signals to be applied to AC switching means 40 continuously, until a higher numbered secondary circuit tap connection is energized.

Each of the driver switches 96', 114', 115', 350 and 116' include an NPN transistor 150, 314, 319, 322 and 328, respectively, each having base, collector and emitter electrodes b, c and e, respectively. Each transistor 150, 314, 319, 322 and 328 has its emitter electrode e connected to conductor 153, and resistors 151, 318, 321, 327 and 340 are connected across their collector-emitter electrodes, respectively.

The base electrode b of transistor 150 of driver switch 96' is connected to the collector electrode c of transistor 181 of Schmitt trigger 170, through a Zener diode 310, and diodes 311 and 312 are connected from the junction 313 between Zener diode 310 and Schmitt trigger 170, to the collector electrode c of transistor 314 in driver switch 114', and to the collector electrode c of transistor 319 in driver switch 115', respectively. If there were still additional taps in the primary circuit, diodes would also be connected from junction 313 to the collector electrodes of their associated driver switch transistors. Zener diode 310 has its anode electrode a connected to the base electrode b of transistor 150, and its cathode electrode c connected to junction 313. The anode electrodes a of diodes 311 and 312 are connected to junction 313, while the cathode electrode c of diode 311 is connected to the collector electrode c of transistor 314, and the cathode electrode c of diode 312 is connected to the collector electrode c of transistor 319.

Driver switch 114' has the base electrode b of its transistor 314 connected to its associated Schmitt trigger circuit 172 through Zener diode 315, and it has a diode 316 connected from the junction 317 between Zener diode 315 and Schmitt trigger 172, to the collector electrode c of transistor 319 in driver switch 115'. Driver switch 114' only requires one lock-out diode since there is only one more higher voltage tap connection in the primary circuit of transformer 30.

Driver switch 115' has the base electrode b of its transistor 319 connected to Schmitt trigger circuit 174 through a Zener diode 320. Since this is the last tap connection in the primary circuit, it does not require any lock-out diodes.

Driver switch 350 is connected to the regulated source voltage E through a Zener diode 323 and a resistor 326. Since there is an additional tap connection in the secondary circuit, a lock-out diode 324 is connected to the junction 325 between the Zener 323 and resistor 326, to the collector electrode c of transistor 328 of driver switch 116'.

Driver switch 116' has the base electrode b of its transistor 328 connected to Schmitt trigger circuit 176 through a Zener diode 329. Since this is the last tap connection in the secondary circuit it does not require any lock-out diodes.

In the operation of the lock-out circuit, when Schmitt trigger 170 is providing its second output level, a voltage greater than the Zener voltage of Zener diode 310 will appear at the collector electrode c of transistor 181. Thus, transistor 150 will be switched to its conductive state, and driver transformer means 60 will provide switching signals to AC switching means 34. Driver transformer means 66 will also be providing switching signals to AC switching means 40 since the voltage on conductor 190 exceeds the Zener value of Zener diode 323. Thus, an output voltage is applied to the load circuit 14. If the control or bias voltage applied to conductor 16 increases to the point where Schmitt trigger 172 is switched to its second output level, which switches transistor 314 to its conductive state, the cathode electrode c of Zener diode 310 will be connected to ground 100 through diode 311, through the conductive transistor 314, and through conductor 153. Thus, Zener diode 310 will no longer provide base drive for transistor 150 and transistor 150 will become nonconductive, de-energizing driver transformer means 60. If the control voltage increases to the point where Schmitt trigger 174 is switched to its second output level, transistor 319 will become conductive. The cathode electrode c of Zener diode 315 will be connected to ground through diode 316, through the conductive transistor 319 and through conductor 153. Since transistor 314 is now nonconductive, it will no longer provide a path to ground through diode 311. However, the cathode of Zener diode 310 will now be connected to ground through diode 312, through the conductive transistor 319, and through conductor 153. Therefore, both transistors 314 and 150 are held off by transistor 319.

If the Schmitt trigger circuit 176 in the secondary circuit becomes conductive, switching transistor 328 to its conductive state, the cathode electrode of Zener diode 323 will be connected to ground 100 through diode 324, through conductive transistor 328, and through conductor 153. Thus, transistor 322 will become nonconductive and driver transformer means 66 will be de-energized.

Figure 4:
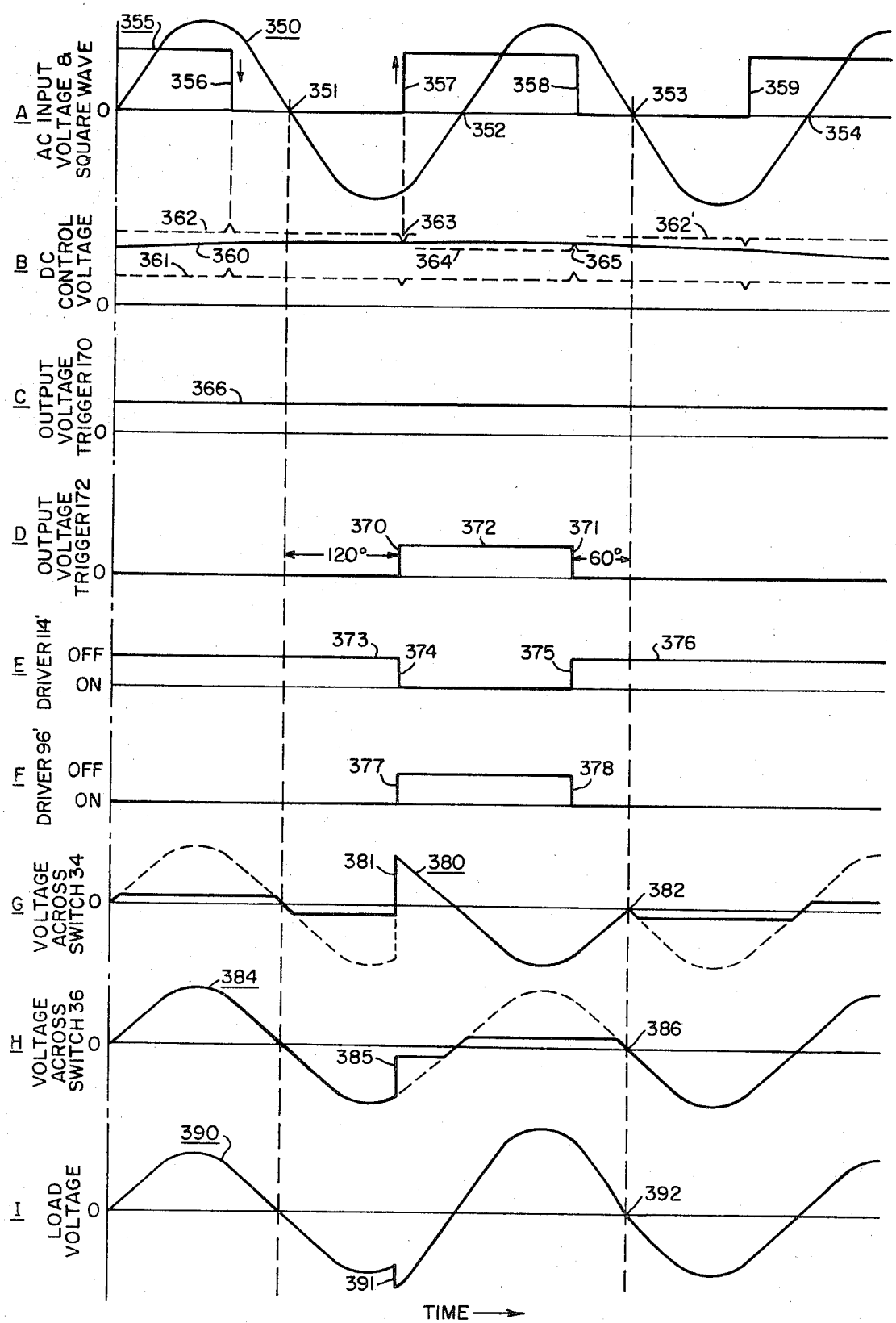
FIG. 4 is a group of curves which are explanatory of the operation of the embodiment of the invention shown in FIG. 3.

The operation of tap changer apparatus 10' shown in FIG. 3 will now be explained, using the curves A through I shown in FIG. 4. Curve A of FIG. 4 illustrates the voltage waveform 350 of the source 12 of AC potential, having negative going zero crossing points 351 and 353, and positive going zero crossing points 352 and 354, and it also illustrates the unidirectional square wave which appears at the collector electrode c of transistor 284 in the steering circuit 280. The unidirectional square wave has a waveform 355, which drops from its maximum to its minimum value at 356, 60° before the zero crossing 351, it increases to its maximum value at 357, 60° before the zero crossing 352, it drops back to its minimum value at 358, 60° before the zero crossing point 353, and it increases to its maximum value at 359, 60° before the zero crossing point of the AC voltage waveform 350, at point 354. In this example, we will assume that Schmitt trigger circuit 170 is in its second output state, with the DC control voltage 360, shown in curve B of FIG. 4, being above the dotted line 361 which represents the magnitude at which Schmitt trigger circuit 170 will switch back to its first output state. The DC control voltage 360 increases gradually, approaching the threshold of Schmitt trigger 172, which is represented by dotted line 362. As the control voltage 360 approaches the threshold 362, it intersects the negative going dip 363 which causes the Schmitt trigger 172 to switch from its first output level to its second ouput level at point 370, as shown in curve D of FIG. 4. The conductive conditions of the driver switches associated with Schmitt trigger circuits 170 and 172 immediately respond, as shown in curves E and F of FIG. 4, with driver switch 114' switching from its nonconductive state, as shown at 373, to its conductive state at point 374, in response to its Schmitt trigger 172, and driver switch 96' switching from its conductive state to its nonconductive state at point 377, in response as soon as Schmitt trigger circuit 172 switches to its second output level, the voltage level at which it will switch back to its first output level drops, which is referenced by dotted line 364. If the DC control voltage 360 now starts to drop along a predetermined ramp, it will intersect the positive going pulse 365 produced by the portion 358 of the unidirectional square wave shown in curve A of FIG. 4, and Schmitt trigger circuit 172 will switch from its second output level 372 to its first output level at point 371. This switching of Schmitt trigger 172 is 60° before the zero crossing point 353 of the source voltage waveform 350.

The effects of these tap changes on the voltage across AC switching means 34, the voltage across AC switching means 36, and the load voltage, will now be examined, with reference to curves G, H, and I of FIG. 4, respectively. The voltage across AC switching means 34 is shown in curve G of FIG. 4, and since it is conductive the voltage drop is only the forward voltage drop across the conductive device. The voltage drop across switching means 36, which is shown in curve H of FIG. 4, is the voltage difference between the tap connections TP1 and TP2. When the tap change is made, the voltage across AC switching means 34 reverses polarity at 381 and starts to follow a sine wave 380 which is out of phase by 180° with the sine wave voltage of the AC source. The voltage across AC switching means 36 drops at point 385 to the forward voltage drop across the conductive device. When the tap change is made back to tap connection TP1, it is made at a zero crossing point of the load current, and for purposes of simplicity it will be assumed that the load current and load voltage are in phase, even though the circuit shown in FIG. 3 will operate with a lagging power factor load. Thus, at point 382 in curve G of FIG. 4, the voltage across AC switching means 34 will again only be the drop across the conductive device, and at point 386 in curve H of FIG. 4, the voltage across switching means 36 will again be the difference between the voltage between tap connections TP1 and TP2.

The effect on the load voltage by these tap changes is shown in curve I of FIG. 4, with the load voltage having the waveform 390. At point 391 the load voltage is stepped up in the middle of the negative half wave cycle and it follows this greater magnitude until point 392, at which point it switches back to a lower magnitude sine wave. Thus, as in the first embodiment of the invention shown in FIG. 1, the output voltage is a sine wave except for those points where a tap change is made to increase the output voltage, at which point there will be a slight step-up in the voltage. When reducing the output voltage, all of the tap changes are made at a current zero crossing point, resulting in no change in the load current magnitude due to the switching. Therefore, the *di/dt* due to the changing of the voltage output level is slight, resulting in the generation of a negligible amount of radio frequency energy.

In summary, there has been disclosed new and improved static tap changer apparatus that changes taps on a transformer in response to the magnitude of a DC bias or control voltage. The output voltage is always a sine wave, except when a tap change is made to increase the output voltage there is a step in the output voltage waveform. This step, however, causes such a minor change in the load current that the *di-dt* is small, generating an insignificant amount of radio frequency energy. Therefore, in most applications RF and harmonic distortion filters may be eliminated. In critical applications, only minimal filtering is required, requiring small, lightweight filters, compared with those necessary in power controller apparatus utilizing phase controlled switching.

Since numerous changes may be made in the above described apparatus and different embodiments of the invention may be made without departing from the spirit thereof, it is intended that all matter contained in the foregoing description or shown in the accompanying drawings shall be interpreted as illustrative, and not in a limiting sense.

We claim as our invention:

1. Static tap changer apparatus whose operating position is responsive to the magnitude of a unidirectional voltage applied thereto, comprising:
   transformer means including at least one electrical winding having a plurality of tap connections, numbered consecutively starting from a predetermined end thereof,
   a source of alternating potential,
   first terminal means connected to said transformer means and to said source of alternating potential,
   a load circuit,
   second terminal means connected to said transformer means and to said load circuit,
   a plurality of bilateral AC switching means connected to said plurality of tap connections on said at least one winding, at least one of said terminal means being connected to said at least one winding through certain of said AC switching means, and being selectively and sequentially connectable to said electrical winding therethrough, a plurality of gate drive means for selectively providing gate drive for said plurality of AC switching means, a plurality of threshold detectors, control means providing a unidirectional voltage having a magnitude which may change, said control means being connected to said plurality of threshold detectors, each of said threshold detectors being arranged to detect a different predetermined voltage magnitude provided by said control means, switching from a first output level to a second output level when its predetermined threshold voltage is reached, and switching back to its first output level at a lower voltage magnitude than the magnitude at which it switched to its second output level, and steering means connected to said plurality of threshold detectors, said steering means directing the switching of said threshold detectors to their second output levels at a predetermined angle relative to the waveform of said source of alternating potential, said plurality of threshold detectors being connected to said plurality of gate drive means such that at least all but one of said plurality of gate drive means are responsive to the switching of a threshold detector, each of the gate drive means connected to a threshold detector providing gate drive for its associated AC switching means when its associated threshold detector switches to its second output level.

2. The static tap changer apparatus of claim 1 wherein the control means is a regulator, adapted to provide a unidirectional voltage having a magnitude responsive to the predetermined parameter to be regulated.

3. The static tap changer apparatus of claim 1 wherein the at least one terminal means connected to the at least one winding is the first terminal means.

4. The static tap changer apparatus of claim 1 wherein the at least one terminal means connected to the at least one winding is the second terminal means.

5. The static tap changer apparatus of claim 1 wherein the first and second terminal means are both connected to certain of the tap connections on the at least one winding through their associated AC switching means.

6. The static tap changer apparatus of claim 1 wherein the load circuit is resistive and the steering means switches the threshold detectors from their first to their second output levels at a voltage zero crossing point of the source of alternating potential, and including time delay means for delaying the initiation of gate drive from a gate drive means for a predetermined angle after its associated threshold detector has switched to its second output level.

7. The static tap changer apparatus of claim 6 wherein the time delay means includes capacitance means.

8. The static tap changer apparatus of claim 1 wherein the threshold detectors are bistable multivibrators connected in the Schmitt trigger configuration, having positive feedback to increase their switching speed between their two output levels, and a loop gain greater than unity to provide hysteresis.

9. The static tap changer apparatus of claim 1, wherein the plurality of gate drive means connected to threshold detectors continue to provide gate drive signals for their associated AC switching means while their associated threshold detector is providing its second output level, with the sequence of selecting the taps being such that as each additional AC switching means is provided with gate drive and rendered conductive, it will commutate the previously conductive AC switching means.

10. The static tap changer apparatus of claim 1 including means for disabling the drive means associated with all AC switching means having a lower numerical number than the highest numbered AC switching means which has its associated threshold detector providing its second output level.

11. The static tap changer apparatus of claim 1 wherein the steering means includes means which senses the voltage zero crossover points of the source of alternating potential, with the steering means directing the switching of the threshold detectors from their first to their output levels at a predetermined angle relative to the voltage zero crossover points, as the control voltage approaches their predetermined switching levels.

12. The static tap changer apparatus of claim 1 wherein the steering means also directs the switching of the threshold detectors back to their first output levels at a predetermined angle relative to the waveform of the source of alternating potential, which predetermined angle is different than the predetermined angle at which said threshold means switch from their first to their second output levels.

13. Regulated power supply apparatus, comprising:
transformer means including at least one winding having a plurality of tap connections numbered consecutively starting at a predetermined end thereof,
a plurality of bilateral AC switching means connected to said plurality of tap connections,
a source of alternating potential,
first terminal means connected to said transformer means and to said source of alternating potential,
a load circuit,
second terminal means connected to said transformer means and to said load circuit,
at least one of said terminal means being connected to said at least one winding through at least certain of said plurality of AC switching means,
gate drive means for selectively providing gate drive signals for each of said plurality of AC switching means,
regulator means providing a unidirectional voltage having a magnitude responsive to the parameter to be regulated,
a plurality of threshold detectors connected to said regulator means, said plurality of threshold detectors being connected to said plurality of gate drive means such that at least all but one of said plurality of gate drive means are responsive to the switching of a threshold detector, said plurality of threshold detectors each being arranged to detect a different predetermined unidirectional voltage magitude from said regulator means, and to switch from a first output level to a second output level at this predetermined unidirectional voltage magnitude, and to switch back to its first output level at a lower magnitude of the unidirectional voltage,
each of said gate drive means providing drive to its associated AC switching means when its associated threshold detector provides its second output level,
and steering means connected to said plurality of threshold detectors which directs the switching of said threshold detectors from their first to their second output levels at a predetermined angle relative to the waveform of said source of alternating potential.

14. The regulated power supply apparatus of claim 13 wherein the steering means switches the threshold detectors from their first to their second output levels at a voltage zero crossing point of the source of alternating potential, and including time delay means for delaying the initiation of the gate drive from each of the drive means connected to threshold detectors, for a predetermined angle after its associated threshold detector has switched to its second output level.

15. The regulated power supply apparatus of claim 13 wherein the threshold detectors are bistable multivibrators connected in the Schmitt trigger configuration, having positive feedback to increase their switching speed between their two output levels, and a loop gain greater than unity to provide hysteresis.

16. The regulated power supply apparatus of claim 13 wherein each gate drive means continues to provide gate drive signals for its associated AC switching means while its associated threshold detector is providing its second output level, with the sequence of selecting the taps being such that as each additional AC switching means is provided with gate drive signals, and rendered conductive, it will commutate the previously conductive AC switching means.

17. The regulated power supply apparatus of claim 13 including means for disabling the gate drive means associated with all AC switches having a lower numerical number than the highest numbered switch which has its associated threshold detector providing its second output levels.

18. The regulated power supply apparatus of claim 13 wherein the steering means includes means which senses the voltage zero crossover points of the source of alternating potential, with the steering means switching the threshold detectors from their first to their second output levels at a predetermined angle relative to the voltage zero cross-over points, as each approaches its predetermined threshold switching level.

19. The regulated power supply apparatus of claim 18 wherein the steering means also directs the switching of the threshold means from their second to their first output levels to a predetermined angle relative to the source of alternating potential which predetermined angle is different than the predetermined angle at which the threshold means switch from their first to their second output levels.

20. The regulated power supply apparatus of claim 13 wherein the at least one terminal means connected to the at least one winding is the first terminal means.

21. The regulated power supply apparatus of claim 13 wherein the at least one terminal means connected to the at least one winding is the second terminal means.

22. The regulated power supply apparatus of claim 13 wherein both the first and second terminal means are connected to certain of the tap connections on the at least one winding through their associated AC switch means.

23. The regulated power supply apparatus of claim 13 including at least first and second windings having a plurality of tap connections thereon, with the AC switching means being connected to the tap connections on said first and second windings, the first terminal means being connected to said first winding through its associated AC switching means, and the second terminal means being connected to said second winding through its associated AC switching means.

24. Static tap changer apparatus whose operating position is responsive to the magnitude of a unidirectional voltage applied thereto, comprising:
transformer means including at least one electrical winding having a plurality of tap connections, numbered consecutively starting from a predetermined end thereof,
first terminal means connected to said transformer means adapted to be connected to a source of AC potential,
second terminal means connected to said transformer means adapted to be connected to a load circuit,
a plurality of bilateral AC switching means connected to said plurality of tap connections on said at least one winding,
at least one of said terminal means being connected to said at least one winding through certain of said AC switching means, and being selectively and sequentially connectable to said electrical winding therethrough,
a plurality of gate drive means for selectively providing gate drive for each of said plurality of AC switching means,
a plurality of threshold detectors,
control means providing a unidirectional voltage having a magnitude which may change, said control means being connected to said plurality of threshold detectors,
each of said threshold detectors being arranged to detect a different predetermined voltage magnitude provided by said control means, switching from a first output level to a second output level when its predetermined threshold voltage is reached,
said plurality of threshold detectors being connected to said plurality of gate drive means such that at least all but one of said plurality of gate drive means are responsive to the switching of a threshold detector, each of the gate drive means connected to a threshold detector, providing gate drive for its associated AC switching means when its associated threshold detector switches to its second output level,
said gate drive means including a square wave oscillator which provides a square wave voltage in phase with the AC voltage applied to said winding, a transformer, and a transistor switch, with said square wave voltage being applied to said transformer when its associated transistor switch is conductive,
and means disabling the drive means associated with each AC switching means, as a higher numbered AC switching means is rendered conductive, including a Zener diode connected between each of said threshold detectors and its associated transistor switch, and a diode connected from each of the Zener diodes to the collector electrodes of each of the transistor switches associated with a higher numbered tap connection, with the diodes being poled to render the Zener diodes nonconductive which are associated with tap connections having a lower numerical number than the highest numbered conductive tap connection.

25. Static tap changer apparatus whose operating position is responsive to the magnitude of a unidirectional voltage applied thereto, comprising:
transformer means including at least one electrical winding having a plurality of tap connections, numbered consecutively starting from a predetermined end thereof,
first terminal means connected to said transformer means adapted to be connected to a source of AC potential,
second terminal means connected to said transformer means adapted to be connected to a load circuit,
a plurality of bilateral AC switching means connected to said plurality of tap connections on said at least one winding,
at least one of said terminal means being connected to said at least one winding through certain of said AC switching means, and being selectively and sequentially connectable to said electrical winding therethrough,
a plurality of gate drive means for selectively providing gate drive for each of said plurality of AC switching means,
a plurality of threshold detectors,
control means providing a unidirectional voltage having a magnitude which may change, said control means being connected to said plurality of threshold detectors,
each of said threshold detectors being arranged to detect a different predetermined voltage magnitude provided by said control means, switching from a first output level to a second output level when its predetermined threshold voltage is reached,
said plurality of threshold detectors being connected to said plurality of gate drive means such that at least all but one of said plurality of gate drive means are responsive to the switching of a threshold detector, each of the gate drive means connected to a threshold detector, providing gate drive for its associated AC switching means when its associated threshold detector switches to its second output level, means providing a square wave voltage which is out of phase with the AC voltage by a predetermined angle, and steering means providing first signals when the square wave voltage changes between its magnitudes in one direction, and means providing second signals when the square wave voltage changes between its magnitudes in the opposite direction, said first signals steering the turn-on of said threshold means and said second signals steering the turn-off of said threshold means.

26. Regulated power supply apparatus, comprising:

transformer means including at least one winding having a plurality of tap connections numbered consecutively starting at a predetermined end thereof, a plurality of bilateral AC switching means connected to said plurality of tap connections, first terminal means connected to said transformer means and being adapted for connection to a source of AC potential, second terminal means connected to said transformer means and being adapted for connection to a load circuit, at least one of said terminal means being connected to said at least one winding through at least certain of said plurality of AC switching means, gate drive means for selectively providing gate drive signals for each of said plurality of AC switching means, regulator means providing a unidirectional voltage having a magnitude responsive to the parameter to be regulated, a plurality of threshold detectors connected to said regulator means, said plurality of threshold detectors being connected to said gate drive means such that at least all but one of said plurality of gate drive means are responsive to the switching of a threshold detector, said plurality of threshold detectors each being arranged to detect a different predetermined unidirectional voltage magnitude from said regulator means, and to switch from a first output level to a second output level at this predetermined unidirectional voltage magnitude, and to switch back to its first output level when the unidirectional voltage drops below a predetermined magnitude, each of said drive means providing drive to its associated AC switching means when its associated threshold detector provides its second output level, said gate drive means including a square wave oscillator which provides a square wave voltage in phase with the AC voltage applied to said winding, a transformer, and a transistor switch, said square wave voltage being applied to said transformer when its associated transistor switch is rendered conductive, and means for disabling the gate drive means associated with all AC switches having a lower numerical number than the highest numbered switch which has its associated threshold detector providing its second output level, including a Zener diode connected between each of said threshold detectors and its associated transistor switch, and a diode connected from each of the Zener diodes to the collector electrode of each of the transistor switches associated with a higher numbered tap connection, with the diodes being poled to render the Zener diodes non-conductive which are associated with the tap connections having a lower number than the highest numbered tap connection associated with an AC switch receiving gating signals.

27. Regulated power supply apparatus, comprising:

transformer means including at least one winding having a plurality of tap connections numbered consecutively starting at a predetermined end thereof, a plurality of bilateral AC switching means connected to said plurality of tap connections, first terminal means connected to said transformer means and being adapted for connection to a source of AC potential, second terminal means connected to said transformer means and being adapted for connection to a load circuit, at least one of said terminal means being connected to said at least one winding through at least certain of said plurality of AC switching means, gate drive means for selectively providing gate drive signals for each of said plurality of AC switching means, regulator means providing a unidirectional voltage having a magnitude responsive to the parameter to be regulated, a plurality of threshold detectors connected to said regulator means, said plurality of threshold detectors being connected to said gate drive means such that at least all but one of said plurality of gate drive means are responsive to the switching of a threshold detector, said plurality of threshold detectors each being arranged to detect a different predetermined unidirectional voltage magnitude from said regulator means, and to switch from a first output level to a second output level at this predetermined unidirectional voltage magnitude, and to switch zack to its first output level when the unidirectional voltage drops below a predetermined magnitude, each of said drive means providing drive to its associated AC switching means when its associated threshold detector provides its second output level, means providing a square wave voltage which is out of phase with the AC voltage by a predetermined angle, and steering means providing first signals when the square wave voltage changes between its magnitudes in one direction, and second signals when the square wave voltage changes between its magnitudes in an opposite direction, said first signals steering the turn-on of said threshold means, and said second signals steering the turn-off of said threshold means.

References Cited

UNITED STATES PATENTS

| | | | |
|---|---|---|---|
| 3,263,157 | 7/1966 | Klein | 323—43.5(S)X |
| 3,375,437 | 3/1968 | Mellott et al. | 323—43.5X |
| 3,384,807 | 5/1968 | Klein et al. | 323—43.5(S)X |
| 3,388,319 | 6/1968 | Paynter | 323—43.5(S) |

J D MILLER, Primary Examiner

G. GOLDBERG, Assistant Examiner

U.S. Cl. X.R.

323—24, 34, 38, 45